United States Patent [19]

Gifford et al.

[11] 4,376,518

[45] Mar. 15, 1983

[54] SNAP-IN ANTI REVERSE SELECTOR

[75] Inventors: Richard L. Gifford, Adair; Lorens G. Hlava; Elvis W. Moss, both of Tulsa, all of Okla.

[73] Assignee: Brunswick Corporation, Skokie, Ill.

[21] Appl. No.: 289,035

[22] Filed: Jul. 31, 1981

[51] Int. Cl.³ ............................ A01K 89/01; A01K 89/02
[52] U.S. Cl. .............................. 242/84.2 R; 74/577 R;
242/84.5 A; 242/99
[58] Field of Search .............. 242/84.1 R, 84.2 R,
242/84.2 A, 84.2 B, 84.21 R, 84.21 A, 84.5 R,
84.51 R, 84.5 A, 99; 74/577 R

[56] References Cited

U.S. PATENT DOCUMENTS

| 3,039,716 | 6/1962 | Visockis | 242/84.2 B |
|---|---|---|---|
| 4,154,413 | 5/1979 | Hull | 242/84.2 A |
| 4,201,355 | 5/1980 | Ruin | 242/84.1 R |
| 4,215,828 | 8/1980 | Rathburn et al. | 242/99 |
| 4,288,046 | 9/1981 | Morimoto et al. | 242/84.21 R |

*Primary Examiner*—Billy S. Taylor

*Attorney, Agent, or Firm*—John G. Heimovics

[57] ABSTRACT

An actuator (150) for an anti-reverse device which is extended through a sleeve in a reel housing and snap-fit thereto. An elongate body (412) with a head (432) and a bifurcated end defines first (415) and second (416) portions which are assembled in the reel from the exterior of the housing. The first portion engages the anti-reverse device. The second portion is fabricated from a resilient material and includes a lip (420) depending from adjacent its inward edge. The second portion is urged toward the first portion as the body is captured within the opening in the reel housing. With the actuator fully seated the lip engages the inside wall (450) and in conjunction with the head (432) captures the wall so as to retain the actuator. A protrusion 428 on the radial outer face of the second portion engages the wall of the opening to resiliently load the respective first and second portions in the opening and engages in one of two detents to position the actuator in one of two setting positions.

15 Claims, 7 Drawing Figures

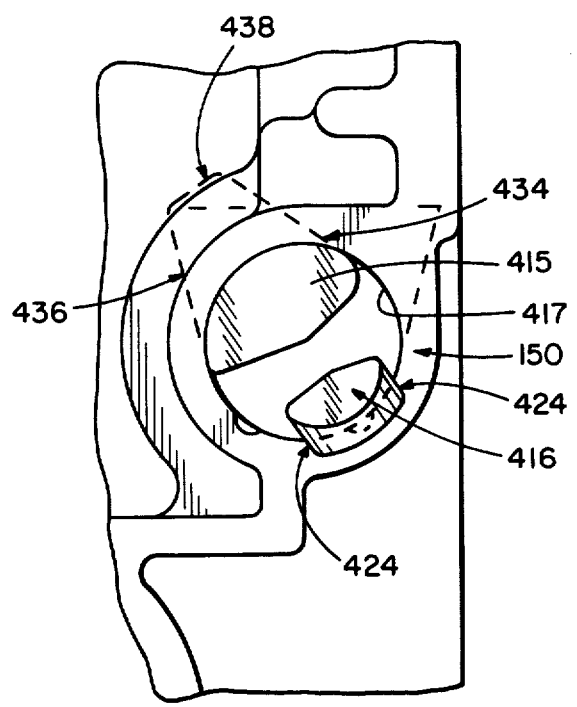
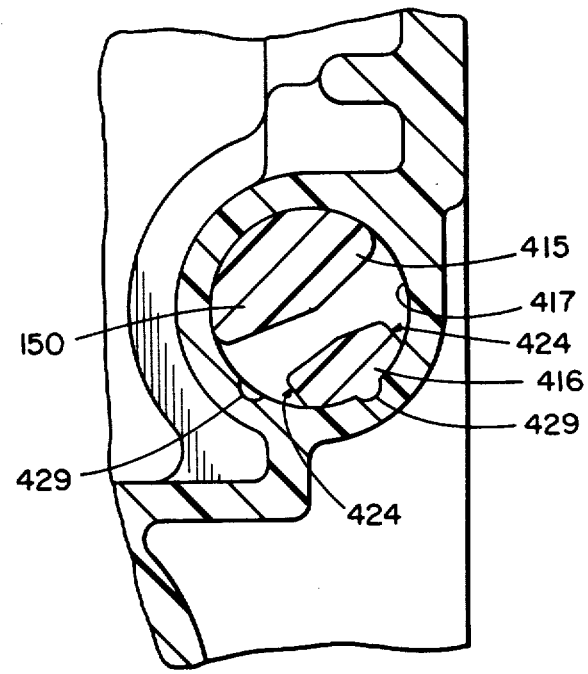
FIG.5    FIG.6
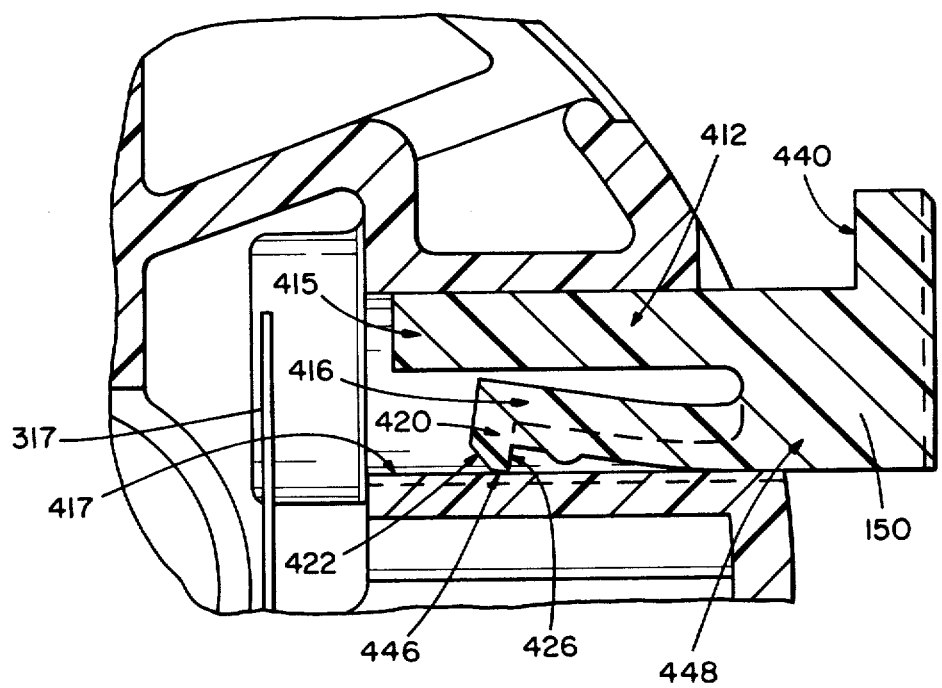
FIG.7

SNAP-IN ANTI REVERSE SELECTOR

TECHNICAL FIELD

This invention relates to a spin casting style fishing reel and, more particularly, to a selector switch for an anti-reverse mechanism.

BACKGROUND ART

To assemble an externally operable anti-reverse selector, an actuator is generally inserted from the outside of a reel and is secured separately from the inside of the reel housing so as to permit the desired movement of the actuator. Exemplary is the anti-reverse actuator disclosed in the application of Henry L. Neufeld, accorded Ser. No. 113,236, and filed Jan. 17, 1980. A solid, substantially cylindrically-shaped stem is extended through a sleeve in the rear portion of the reel housing. An expanded head, through which the actuator is manipulated, carries a protrusion which coacts with a pair of detent slots at the exterior of the housing. A hemispherical boss is formed at the interior end of the stem, which is operably engageable with an anti-reverse drag arm. To assemble the actuator, the stem is extended through the housing after which a retaining clip must be assembled within an annular groove on the interiorly protruding portion of the stem. The clip retains the stem and provides a spring force to urge the protrusion into the detent slots.

DISCLOSURE OF THE INVENTION

The present invention proposes the use of a one-piece anti-reverse actuator which is snap-fit within a reel housing. An elongate member has a bifurcated end defining first and second portions which are extensible through an opening in the reel housing. The first portion is engageable with the anti-reverse device. The second portion is resilient in nature and includes a lip adjacent its end, which lip engages the inside wall of the reel housing with the actuator fully seated. A head at the exterior end of the elongate member abuts the outside of the housing to confine inward movement of the actuator and serves also as a means to manipulate the same. The actuator is assembled by urging the second portion towards the first portion until the first and second portions, including the lip, are captured within the opening, and thereafter extending the actuator through the housing. Once the lip has cleared the interior edge of the wall, the second portion flexes back towards its original position so that the wall of the housing is captured between the lip and the head at opposing ends of the actuator.

The invention facilitates assembly of the actuator from the outside of the reel housing, as opposed to the prior art apparatus which require assembly from both sides of the housing. The one-piece construction additionally obviates the need for a retaining member at the interior of the housing. Thus the invention avoids those costs associated with the additional metal clip and at the same time simplifies the assembly of the actuator.

BRIEF DESCRIPTION OF THE DRAWINGS

FIG. 5 is an enlarged partial cross-sectional view of the actuator along lines 5—5 of FIG. 4.

FIG. 6 is an enlarged partial cross-sectional view of the actuator along lines 6—6 of FIG. 4.

FIG. 7 is an enlarged partial cross-sectional view of the actuator along the lines 7—7 of FIG. 2 showing the actuator partially extended through the reel housing.

DESCRIPTION OF THE BASIC STRUCTURE AND OPERATION OF FISHING REEL

Figure 1:
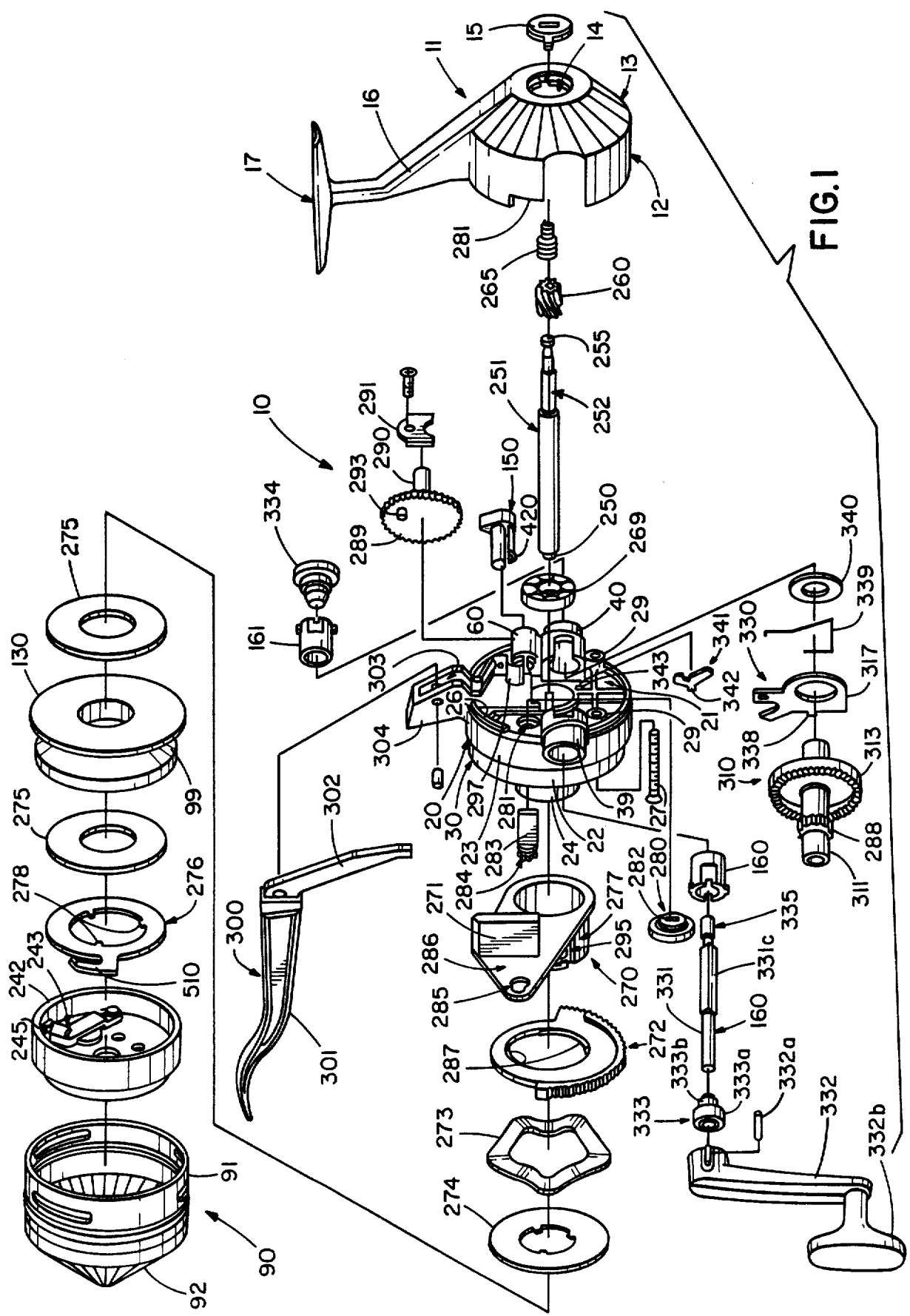
FIG. 1 is an exploded perspective view of a spin-casting style fishing reel employing the actuator of the present invention.

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semi-spherical rear wall 13 having a center opening 14 in which is seated a back cap 15. A stem 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23.

A central hub 24 projects forward of the deck plate 21 with an oscillatable spool carrier 270 mounted on the hub for axial oscillating movement relative to the hub. The spool carrier 270 is keyed by plate 271 to the deck plate 21 to permit the oscillating movement, with said plate 271 preventing rotation of the spool carrier 270 relative to the hub 24. A geared clutch 272, a wave spring or clutch ring 273, a stainless steel washer 274, a flat drag washer 275, the spool 130, a second flat drag washer 275 and a dual spool clip and clicker 276 all surround a sleeve 277 on said spool carrier 270. The spool clip 276 has lugs 278 which engage with grooves 295 in the sleeve 277 of the spool carrier 270 for retaining the spool and related associated parts on the spool carrier 270.

The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch wheel 280 projects partially through an opening 281 in the side wall of the edge of the back support housing 11 and has a shaped slot 282 through the mid-portion thereof through which a shaped shaft 283 is slidably received. The shaft 283 extends through the deck plate 21 and has a clutch pinion 284 on the front end thereof. The shaft 283 is rotatably mounted in the opening 285 in the flange 286 of the spool carrier 270. The pinion 284 meshes with the gear of the geared clutch 272. Cams 287 on the geared clutch 272 engage with mating cams (not shown in FIG. 1) on the spool carrier 270. Rotating the clutch wheel 280 rotates the geared clutch 272 to move the cams relative to each other to move the geared clutch 272 axially along the sleeve 277 of the spool carrier 270. Movement of the geared clutch away from the flange 286 of the spool carrier 270 will increase the drag or clamping force on the spool 130 while movement in the opposite direction will decrease the drag or clamping force on the spool 130, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and the center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rear of the abutting end 255 of the center shaft 251. When the exterior operating handle 301 of the finger brake lever 300 is pulled upward toward the mounting foot 17, operating leg 302 engages the end 255 of the center shaft 251. The center shaft 251 and the spinner head assembly 242 mounted thereon are pushed forward relative to the bearing 269 and the hub 24. A pickup pin mechanism 243, mounted on and within spinner head assembly 242, is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an anti-reverse assembly 330 and a pinion gear 288 for the oscillatable spool carrier 270, both of which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion of the shaft 251 disengages the pickup pin mechanism 243 from the forward face of the cam (not shown in FIG. 1) on the hub 24, causing the spinner head assembly 242 to move rearward as the pickup pin mechanism 243 rides up the cam (not shown in FIG. 1) to extend the pickup pin 245 outwardly beyond the spinner head assembly 242 so that the rotation of the crank handle 332 will rotate the spinner head assembly 242 to wind the fishing line 99 on the spool assembly 130.

The crankshaft 311 has the pinion gear 288 either integrally formed or keyed thereon, with the pinion gear 288 meshing with an oscillator gear 289 mounted on a shaft 290 which shaft is rotatably mounted by retainer 291 to a pillow block 292 formed on the deck plate 21. A pin 293 on the oscillator gear 289 engages in a slot (not shown in FIG. 1) in the plate 271 on the spool carrier 270 with the slot extending along an axis transverse to the axis of the shaft 251. Rotation of the crank handle 332 will rotate the oscillator gear 289 which in turn will oscillate the spool carrier 270 and spool 130 back and forth along the shaft 251 as the spinner head assembly 242 is rotating about the axially oscillating spool 130.

Crank assembly 310 is coupled with an anti-reverse assembly 330, which comprises a ratchet (not shown) mounted on the crankshaft 311 against the back side of face gear 313, an anti-reverse drag arm 317 having a transverse lug 338, a drag spring 339 and spacer washer 340 all mounted on the hollow crankshaft 311. An anti-reverse pawl 341 having a pivot tang 342 pivotably mounted in an aperture 343 in the deck plate 21, is positioned against the back of the face gear 313 between the deck plate 21 and the transverse lug 338 on the drag arm 337 for engageable and disengageable contact with the ratchet.

Anti-reverse actuator 150 is mounted in upper housing sleeve 60 that opens through the wall of the rearward body portion 23 of body 20 and the actuator 150 is retained in the sleeve 60 by an integrally formed lip 420 on the actuator 150 which snaps beyond the edge of the sleeve 60. The anti-reverse actuator 150 is in cooperative contact with the anti-reverse drag arm 317. In one position, the actuator 150 disengages the anti-reverse assembly 330 permitting the crank rod 331 and the crank assembly to rotate in either the forward direction (upward toward the stem 16) or the reverse direction (downward toward the stem 16 toward the back of the reel 10). In a second position of the actuator 150, the crank assembly cannot be rotated in forward direction.

DESCRIPTION OF THE PREFERRED EMBODIMENTS

Figures 2, 3, 4:
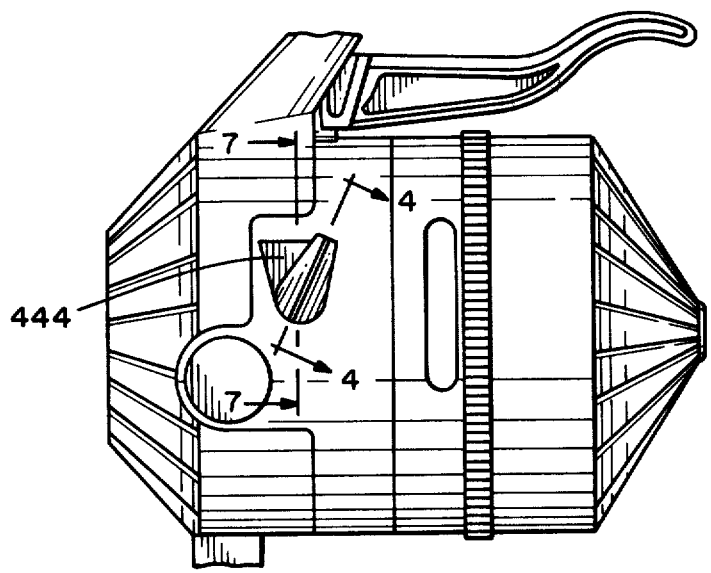
FIG. 2 is a side elevational view of the reel of FIG. 1.
FIG. 3 is an enlarged perspective view of the actuator of the present invention.
FIG. 4 is an enlarged partial cross-sectional view of the actuator along lines 4—4 of FIG. 2 with the actuator fully seated in the reel housing.

Turning to FIGS. 2-7, inclusive, the construction of a preferred form of drag actuator 150 is shown in detail. The actuator is mounted in the sidewall of the body reel of the housing as illustrated in FIG. 2. With the actuator rotated clockwise to the FIG. 2 position, the anti-reverse assembly is engaged. The actuator 150 comprises a head portion 410 and an elongate substantially cylindrical body portion defining a stem 412 extending from and in substantially perpendicular relationship to the head portion 410. A longitudinal slot 414 extends along the length of the stem 412 so as to define an upper first leg portion 415 and a lower second leg portion 416. The first portion extends through the reel housing sufficiently to engage a drag arm 317 and is substantially hemispherically configured so as to mate operatively with a corresponding portion of the arm 317.

An opening 417 receiving the actuator is formed by a bore in the wall 418 of the reel housing and is substantially circular in cross-section corresponding to the shape of the actuator stem. The opening is dimensioned slightly larger than the actuator for reasons that will become evident subsequently.

Returning to the actuator structure, and specifically to the second portion 416 of the stem 412, there is shown the integrally constructed lip 420 which retains the actuator within the reel housing. The lip 420 depends from the second portion so as to define an externally facing surface 426, which resides in a plane substantially perpendicular to the longitudinal axis of the stem. The forward part of the second portion includes a beveled edge 422 which facilitates insertion of the actuator 150 as discussed in succeeding paragraphs. The lateral edges 424 of the second portion are squared as seen most clearly in FIGS. 5 and 6 such that the second portion is substantially rectangular in cross-section. The bottom surface retains the curved contour of the circular elongate body.

The head portion 410 includes a radial extension 432 from the stem 412. The extension is defined by a pair of edges 434, 436 described by two tangential lines disposed inwardly towards each other, and includes a flat upper surface 438. The inner wall 440 of the head 410 is defined by a flat surface which fits flushly against the outer surface of the reel housing with the selector fully seated. The housing wall 418 is recessed and substantially planar in the region 444, FIG. 2, traversed by the head of the actuator between the engaged and disengaged positions to facilitate a close engagement between the head of the actuator and the housing, which facilitates rotational movement of the actuator relative to the reel housing.

To assemble the actuator, the inward edges of the first and second portions are introduced to the opening 417 in the reel housing. Because the addition of the lip 420 makes the dimension of the end of the stem 412 larger than that of the opening 417, the second portion will flex upwardly as it is guided inwardly by the bevel 422 at the forward edge of the body. The second portion should be more resilient than the first portion which is assured by the former being of a reduced cross-sectional area. With the lip 420 residing entirely in the opening, the second portion is bowed as indicated in FIG. 7 so that the actuator slides along the top surface of the first portion 415 and along the bottom edge 446 of the lip and the unflexed portion 448 of the second portion 416 of the main body adjacent the end of the slot. As the lip 420 clears the inner edge of opening 417, it snaps over said inner edge into seated position.

With the actuator fully seated, as in FIG. 4, the externally facing surface 426 of the lip 420 seats closely behind the wall and against the inner surface 450 of the reel housing. A protrusion 428 is molded substantially centrally of the bottom surface 430 of the second portion and preferably takes the shape of a rounded dimple. Between the engaged and disengaged positions, the actuator is biased substantially upwardly by the dimple 428 which engages the wall 418 of the sleeve defining the bore or opening 417 in the reel housing. The wall of the opening 417 is provided with a pair of spaced detents 429 to receive the dimple 428 in the engaged and disengaged positions so as to lock the actuator in either of the two positions.

It should be noted that the recessed planar region 444 in the housing is designed to receive the selector only in a proper upright position where it is engageable with the anti-reverse mechanism. Should the selector be introduced with the head disposed irregularly downward, the inwardly facing surface of the head will abut the rounded portion of the reel housing 452 which prevents insertion sufficient to seat the lip 420. When seated in the reel body, the actuator 150 rides in the opening 417 on the cylindrical outer surface of the first portion 415 and on the unflexed portion 448 of the second portion 416 so as to turn and seat firmly and without wobble relative to the reel body. The resilience of the second portion 416 urges the dimple 428 in one or the other of the detents 429 depending on which setting of the actuator is desired. The resilience of said second portion 416 also holds the actuator in the selected position against accidental displacement.

We claim:

1. In a spinning type reel having a selective anti-reverse device and an actuator extending through an opening in the reel housing for actuating the anti-reverse device, the improvement wherein the actuator comprises:
   an exteriorly situable head portion;
   a first portion extensible within the housing and engageable with the anti-reverse device;
   a second portion extensible within the housing and movable relative to the first portion;
   means on the second portion engageable at the interior of the housing to retain the actuator within the reel housing whereby the actuator may be snap-fit within the opening in the housing; and
   a protrusion is included on the second portion which protrusion engages the reel housing and urges the first portion into engagement with the housing.

2. The spinning reel of claim 1 wherein the second portion is fabricated from a resilient material which permits flexing of the second portion towards the first portion when the first and second portions are captured in the opening in the reel housing.

3. The spinning reel of claim 1 wherein a space is included between the first and second portions within which space the second portion can be flexed.

4. The spinning reel of claim 1 wherein the means on the second portion comprises a lip constructed integrally with the second portion, which lip engages the reel housing with the actuator fully seated.

5. The spinning reel of claim 1 wherein the means on the second portion is a transversely extending lip on the forward end of the second portion, and wherein the forward end of the second portion is beveled, which beveled end engages the wall of the opening in the reel housing and guides the lip within the opening as the actuator is assembled.

6. The spinning reel of claim 4 wherein the lip includes a substantially flat face which mates with the inside wall of the reel housing with the actuator assembled.

7. The spinning reel of claim 1 wherein a pair of detents are formed in the opening for engagement one at a time with the protrusion to hold the actuator in one of two positions.

8. In a spinning type reel of the type having a selective anti-reverse device and an actuator for actuating the anti-reverse device, which actuator is extended through a substantially circular opening in the reel housing, the improvement wherein the actuator comprises:
   a substantially circular elongate stem which includes a longitudinal slot defining first and second portions of the stem;
   the first portion extending within the housing and engageable with the anti-reverse device;
   the second portion extending within the housing and engaging the inside wall of the housing;
   a head portion extending radially outward from the elongate stem adjacent an end thereof;
   the first portion is substantially hemispherical in cross-section; and
   the first portion is more rigid than the second portion such that the second portion flexes towards the first portion when the elongate stem is captured within the opening.

9. The spinning reel of claim 8 wherein the second portion extends radially outwardly adjacent its end so as to define a lip which is engageable with the wall of the reel housing.

10. The spinning reel of claim 8 wherein the lip and head portion extend from diametrically opposing regions of the elongate stem.

11. The spinning reel of claim 8 wherein a protrusion is included intermediate the ends of the second portion, which protrusion is engageable with the inner wall defining the circular opening in the reel housing.

12. In a spinning reel of the type having a selective anti-reverse device and an actuator for actuating the anti-reverse device, which actuator is extended through an opening in the reel housing, the improvement wherein the actuator comprises:
   a substantially circular elongate body;
   a longitudinal slot extending along the circular elongate body and dividing the body into a first and second body portion, the first and second body portions extending within the reel housing and engaging respectively the anti-reverse device and the inside wall of the reel housing;
   a lip formed integrally with the second portion and extending such that the radial dimension of the body is greater than the radius of the opening in the reel housing;
   a radially extending head portion at the exterior end of the actuator; and
   a protrusion on the second portion; wherein the actuator is assembled by introducing the elongate body into the opening in the reel housing so that the lip and first portion are captured within the opening so as to urge the second member radially inwards toward the first member, and the second portion extends radially outwardly as the lip extends beyond the wall of the reel housing, wherein the protrusion on the second portion engages the wall and urges the second portion radially inwardly thereby urging the first portion into engagement with the wall of the reel housing.

13. The spinning reel of claim 12 wherein the protrusion comprises a dimple at the lower region of the second portion.

14. The spinning reel of claim 12 wherein the dimple engages a detent in the reel housing when the actuator is in either the engaged or disengaged position so as to lock the actuator relative to the reel housing.

15. In a spinning reel of the type having a selective anti-reverse device, and an actuator for actuating the anti-reverse device, which actuator is extended through an opening in the reel housing wherein the wall surrounding the reel opening is recessed toward the interior of the reel housing in the region within which the actuator is operable, the improvement wherein the actuator comprises:
   an elongate substantially circular stem with a bifurcated end defining a first portion and a resilient second portion, the first portion being engageable adjacent its end with the anti-reverse device;
   a lip formed on the second portion which is engageable with the inside wall of the reel cover in the fully seated position; and
   a head at one end of the elongate stem including a portion directed radially outwardly therefrom wherein the actuator is fully seatable with the lip engaging the inside wall of the reel housing only when the head intersects the region within which the wall is recessed.

* * * * *